(12) United States Patent
Arneson et al.

(10) Patent No.: US 7,467,352 B2
(45) Date of Patent: Dec. 16, 2008

(54) METHOD AND APPARATUS FOR MAPPING CORRESPONDING FUNCTIONS IN A USER

(75) Inventors: Theodore R. Arneson, Ivanhoe, IL (US); Christopher W. Drackett, Chicago, IL (US); Steven J. Nowlan, South Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 327 days.

(21) Appl. No.: 11/275,375

(22) Filed: Dec. 29, 2005

(65) Prior Publication Data

US 2007/0157103 A1 Jul. 5, 2007

(51) Int. Cl.
G06F 3/00 (2006.01)

(52) U.S. Cl. .................. 715/705; 715/708; 715/709

(58) Field of Classification Search ............ 715/771, 715/866, 705, 708, 709
See application file for complete search history.

(56) References Cited

U.S. PATENT DOCUMENTS

| | | | | |
|---|---|---|---|---|
| 4,992,972 | A * | 2/1991 | Brooks et al. | 715/708 |
| 5,363,482 | A * | 11/1994 | Victor et al. | 715/804 |
| 5,442,759 | A * | 8/1995 | Chiang et al. | 705/1 |
| 5,577,186 | A * | 11/1996 | Mann et al. | 715/203 |
| 6,101,506 | A * | 8/2000 | Ukai et al. | 707/203 |
| 6,219,047 | B1 * | 4/2001 | Bell | 715/705 |
| 6,349,203 | B1 * | 2/2002 | Asaoka et al. | 455/414.3 |
| 6,594,466 | B1 * | 7/2003 | Harned et al. | 434/350 |
| 6,898,764 | B2 * | 5/2005 | Kemp | 715/762 |
| 6,920,612 | B2 * | 7/2005 | Makinen | 715/705 |
| 7,071,934 | B1 * | 7/2006 | Faoro et al. | 715/229 |
| 7,117,482 | B2 * | 10/2006 | Nguyen et al. | 717/122 |
| 2002/0133581 | A1 * | 9/2002 | Schwartz et al. | 709/223 |
| 2004/0027373 | A1 * | 2/2004 | Jacquot et al. | 345/730 |
| 2004/0221241 | A1 | 11/2004 | Kim | |
| 2005/0108648 | A1 | 5/2005 | Olander et al. | |
| 2005/0120313 | A1 | 6/2005 | Rudd et al. | |
| 2005/0234984 | A1 * | 10/2005 | Rogerson et al. | 707/104.1 |
| 2006/0075344 | A1 * | 4/2006 | Jung et al. | 715/705 |

(Continued)

FOREIGN PATENT DOCUMENTS

JP 10247800 A * 9/1998

(Continued)

OTHER PUBLICATIONS

Research Disclosure No. 328,029A, automated prgressive learning and instruction of system and capabilities enables user to disable monitor, review previously studied topics and modify frequency of tutorials, published Aug. of 1991.*

*Primary Examiner*—Rachna S Desai
*Assistant Examiner*—Gregory A Distefano

(57) ABSTRACT

A first user interface is presented (101) within a portable electronic device. The selection of a first function by the user via the first user interface is then detected (102). In response to detecting (102) the user's selection of the first function, the first user interface is then replaced (103) with at least a partially disabled second user interface that is different from the first user interface. A user selection of at least one user-selectable function in the second user interface is then detected (104). After the function is detected, the first user interface provides (105) the user with information regarding at least one corresponding user-selectable function that comprises a substantially similar function as the selected user-selectable function from the second user interface.

15 Claims, 4 Drawing Sheets

U.S. PATENT DOCUMENTS

2006/0081695 A1*  4/2006  Jung et al. .................. 235/375
2006/0116979 A1*  6/2006  Jung et al. ..................... 707/2
2007/0015118 A1*  1/2007  Nickell et al. ............... 434/118
2007/0128899 A1*  6/2007  Mayer ........................ 439/152

FOREIGN PATENT DOCUMENTS

JP          2000322409 A  * 11/2000

* cited by examiner

METHOD AND APPARATUS FOR MAPPING CORRESPONDING FUNCTIONS IN A USER

TECHNICAL FIELD

This invention relates generally to electronic device user interfaces.

BACKGROUND

Various types of electronic devices are known in the art. Typically, the electronic device will have a user interface that allows the user to interact and communicate with the electronic device and have the device perform desired functions. A variety of user interfaces are known in the art and can be unique to the type of device involved. For example, mobile phones generally have a user interface comprised of a combination of interface features, including but not limited to a display, keypad, curser keys, and soft keys. Through use of the electronic device, users become generally familiar with the specific user interface and the associated functions that are provided for that device.

Each type of electronic device, as well as the variety of makes and models within each type, will generally have a different interface. User interfaces for an electronic device tend to change quickly as new products and user interfaces are introduced. As a result, users will frequently encounter new user interfaces for a device that may be different from previous, and generally more familiar, user interfaces. A new user interface may be provided to the user by any of a variety of sources, such as, for example, from a service provider, from a remote source based on user request, from another user or simply by purchasing a different version of the device. Frequently, the user will be relatively unfamiliar with the operation of the new user interface as compared to the old interface. As a result, the user may have problems navigating the new user interface. The user may be familiar with the functions necessary to execute a specific task in the old user interface, but will not know the correlating functions to perform that same task in the new interface.

One approach to easing user interface migration would be to maintain a standard user interface for each type of electronic device. This approach, however, has disadvantages. If a standard interface is used, that interface must then be used for every version of a device. As a result, any advancements or improvements on the device may be hindered. The practice of using a standard interface would greatly limit the features of a device as both the device and technology evolve. New features could not be introduced if they do not conform to the requirements of the standard interface.

Simply put, present electronic devices do not provide a user-friendly method for easing the transition from an old interface to a new interface and for assisting the user in learning new user interface arrangements and functions.

BRIEF DESCRIPTION OF THE DRAWINGS

The above needs are at least partially met through provision of the Method And Apparatus For Mapping Corresponding Functions in a user interface described in the following detailed description, particularly when studied in conjunction with the drawings, wherein.

Figure 1:
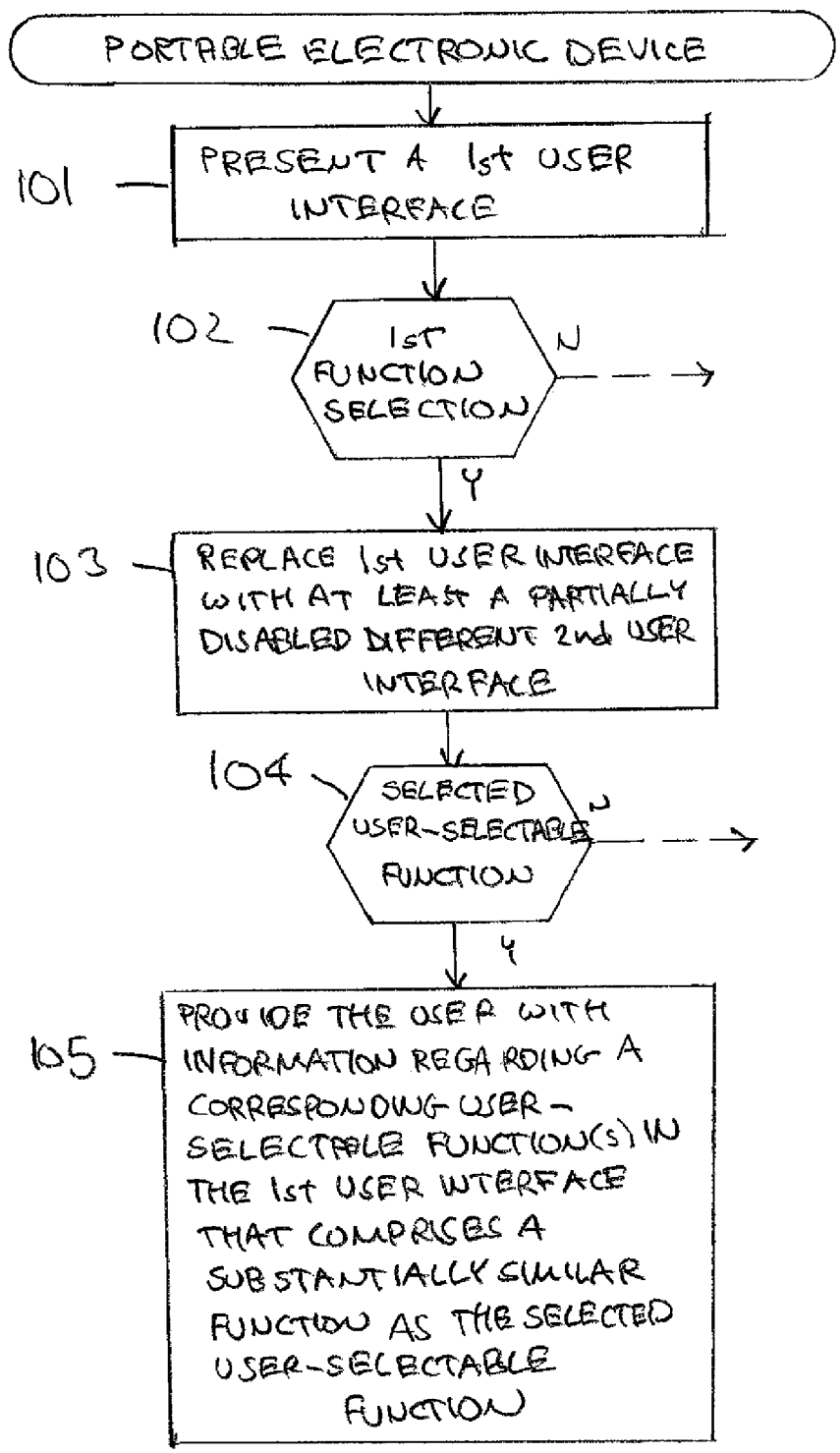
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, these various embodiments are suitable for deployment in conjunction with a portable electronic device. Pursuant to a general approach in accordance with these teachings, a first user interface is presented within the portable electronic device. The selection of a first function by the user via the first user interface is then detected. In response to detecting the user's selection of the first function, the first user interface is then replaced with at least a partially disabled second user interface that is different from the first user interface. A user selection of at least one user-selectable function in the second user interface is then detected. Upon this detection, the first user interface provides the user with information regarding at least one corresponding user-selectable function that comprises a substantially similar function as the selected user-selectable function from the second user interface.

The detection of a user-selectable function via the disabled second user interface can comprise detecting a user selection of a menu mapping function. In addition, the detection of a user-selectable function can comprise detecting a series of functions or a nested series of related user-selectable functions.

The provision of information to the user regarding at least one corresponding user-selectable function in the fist user interface can comprise automatically actuating a macro to facilitate providing the user with information. Or, the provision of information can comprise highlighting a user-selectable portion of the first user interface as corresponds to that corresponding user-selectable function. The modality differences between the first and second user interfaces may also be highlighted. The highlighting can be accomplished, for example, by animating the user-selectable portion, altering a visual or audible aspect of the user-selectable portion, providing audible context information, or animating a user-selection tool.

So configured, corresponding user-selectable functions can be readily mapped between a first and second user interface. The mapping and tutorial process is relatively intuitive and simple to accomplish and, as a result, will assist the user in understanding new user interface functions. This, in turn, allows a user to effectively and efficiently transition from an old user interface to a new user interface.

These and other benefits may become clearer upon making a thorough review and study of the following detailed description. Referring now to the drawings and in particular to FIG. 1, these teachings are generally intended for application in conjunction with a portable electronic device. Examples of a portable electronic device include, but are not limited to:
  a portable wireless communication device;
  a personal digital assistant;
  a palmtop computer;
  a consumer entertainment device (for example, a set-top box or a digital video recorder);

to note but a few relevant examples.

A given enabling method 100 will present a first user interface 101 in the portable electronic device. It is appreciated that a variety of user interfaces are known in the art and can be unique to the particular device involved. The first user interface can comprise, for example, at least one of:
  a display;
  a touch-sensitive display;
  at least one soft key;
  at least one virtual key;
  a voice recognition interface;
  a cursor movement interface;
  a handwriting recognition interface;
  an orientation-sensitive interface;
  at least one key; and/or
  a finger tracking interface.

Upon being provided with the first user interface, a user selection of a first function is detected 102 via the first user interface. The detection of the user selection may comprise, for example, detecting a user selection of a menu mapping function. This function may be selected in any manner provided by the user interface of the device, such as by using any of the user interface elements discussed above. In addition, the function may be labeled in any of a variety of ways. As illustrative examples, the function may be labeled as "menu map" or "tutorial." The selection of this function will then initiate the menu mapping or tutorial process. If the user selection of a first function is not detected, the first user interface remains as is and the flow of FIG. 1 is terminated. The user may then proceed as desired in the normal operation of the first user interface.

In response to detecting the user selection of the first function, the first user interface is then replaced 103 with at least a partially disabled second user interface that is different than the first user interface. Replacing the first user interface comprises completely substituting the displayed content of the first user interface with the displayed content of the second user interface, such that the displayed content of the second user interface completely covers the displayed content of the first user interface. This second user interface will typically be a user interface previously used by the user. As a result, the user will generally be more familiar with the second user interface and accustomed to the functions associated with the second user interface. In addition, this second user interface will be distinct from the first user interface by, for example, having at least one function or arrangement that is different from the first user interface.

Examples of replacing 103 a partially disabled second user interface include, but are not limited to:
  using a pre-provisioned version of the disabled second user interface;
  using a pre-provisioned abridged and disabled version of the second user interface; and/or
  obtaining at least a portion of the second user interface from a remote source.

The second user interface may be pre-provisioned in the portable electronic device, such as, for example, by having it previously stored in the portable electronic device. The second user interface may also be abridged such that the interface that is provided may contain less than all of the functions and options available in a complete version. Alternatively, for example, the second user interface may be obtained from a remote source. Obtaining at least a portion of the second user interface from a remote source may include, for example, the second interface being supplied or "pushed" by a service provider, another user, or any other host. Or, if desired, the second user interface may be "pulled" or otherwise obtained from the remote source by request of the user.

The second user interface is at least partially disabled such that the second user interface does not actually execute the user selected function. Rather, the second user interface will detect the functions so that the corresponding function may then be shown in the first user interface. As such, this partially disabled second user interface may be regarded as a menu mapping or tutorial version of a previously used, and generally more familiar, user interface.

Upon replacing 103 the first user interface with at least a partially disabled second user interface, a user selection of at least one user-selectable function may be detected 104 via the at least partially disabled second user interface to provide a selected user-selectable function. The user-selectable function may be selected in any manner provided by the second user interface and may include, for example, using any of the user interface elements discussed above that may be provided in the second user interface. In addition, the selection of the user-selectable function may involve, for example, a sequence of selections or a single selection. If the user selection of at least one user-selectable function in the second user interface is not detected, the user will remain in the mapping or tutorial mode of the partially disabled second user interface and the flow of FIG. 1 is terminated. The user may then proceed as desired, such as, for example, by exiting the second user interface and the mapping mode and returning to the first user interface.

The detection 104 of the at least one user-selectable function via the disabled second user interface may comprise, for example, detecting a user selection of a series of user-selectable functions. The selection of a particular function in the second user interface may require the user to advance through the selection of a series of functions in the second user interface. Therefore, this series of selections is detected via the second user interface.

The detection 104 of a user selection of a series of user-selectable functions may further comprise detecting a user selection of a nested series of related user-selectable functions. Therefore, the series of user selectable functions may be nested, such that, for example, one function is selected within another function. This nested series of functions is then detected via the second user interface.

After the detection 104 of at least one user-selectable function via the at least partially disabled second user interface, the user is then provided 105 with information regarding at least one corresponding user-selectable function in the first user interface that comprises a substantially similar function as the selected user-selectable function. This information will generally describe how to execute a function in the first user interface that is substantially similar to the function selected in the partially disabled second user interface. The at least one corresponding user-selectable function in the first user interface may comprise a single function or multiple functions, depending on how the corresponding function is executed in the first user interface.

The user may, for example, be provided 105 with information regarding the corresponding function in the first user interface by automatically actuating a macro to facilitate providing the user with the information. As an example, the macro could execute a series of commands or actions that would indicate to the user how to perform the corresponding function in the first user interface.

The user may also be provided 105 with information in the first user interface regarding the corresponding function by highlighting a user-selectable portion of the first user interface as corresponds to the function selected by the user in the second user interface. The highlighting of a user-selectable portion of the first user interface may be accomplished, for example, by at least one of:

animating the user-selectable portion;
altering a visual aspect of the user-selectable portion;
altering an audible aspect of the user-selectable portion;
providing audible context information; and/or
animating a user-selection tool, to name but a few options.

The highlighting of the user-selectable portion of the first user interface as corresponds to the selected function in the second user interface may also comprise providing information regarding modality differences as differentiate the first user interface and the second user interface. The mode of execution of a particular function in each interface may be different and information regarding that difference may be provided to the user. For example, a function in the second interface may be executed by entering a sequence of key presses, while that corresponding function in the first interface would be accomplished using a single voice command. Therefore, the user would be informed that a different mode (i.e., voice) should be used to perform the function in the first user interface.

The user may also be provided 105 with information in the first user interface regarding the corresponding function by using at least one of (1) a correlation reference that directly correlates user-selectable functions for the first user interface with user-selectable functions for the second user interface or (2) a correlation reference that indirectly correlates user-selectable functions for the first user interface with user-selectable functions for the second user interface. A direct correlation will involve a one to one relationship between the selected function in the second user interface and the corresponding function in the first user interface. Conversely, an indirect correlation will involve, for example, a one to many, many to one, or many to many relationship between the selected function in the second user interface and the corresponding function in the first user interface. As an example, one or more user-selectable functions in the second user interface may map into a single function in the first user interface.

It would be understood by one skilled in the art that many useful options and embodiments may be considered for mapping corresponding functions in a user interface under the methods described above. Several figures presenting illustrative schematics of various embodiments will now be discussed. It should be noted and understood at the outset that these display schematics are illustrative embodiments of the methods used for mapping corresponding functions in a user interface. As such, it will be clearly understood that the options, functions, arrangements, and displays of these teachings are not limited to those specifically shown in these embodiments.

Figure 2:
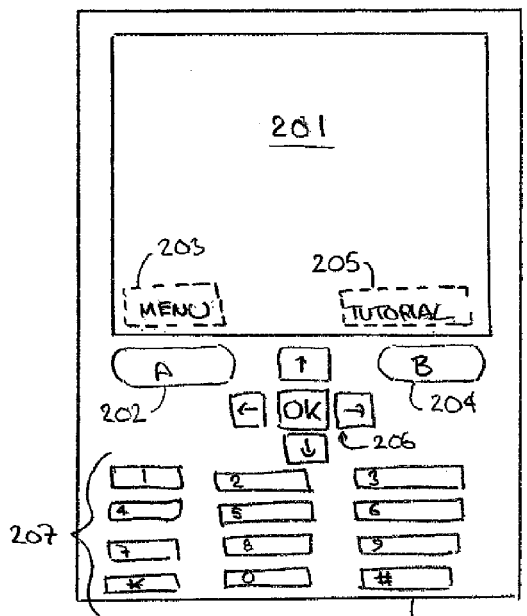
FIG. 2 comprises a schematic example of a display as configured in accordance with various embodiments of the invention.

Referring now to FIG. 2, a schematic display of a mobile phone 200 is provided. The mobile phone has a first user interface comprised of a display 201, a first soft key "A" 202 that selects a "menu" function 203, a second soft key "B" 204 that selects a "tutorial" function 205, cursor selection keys 206, and a numbered keypad 207. This first user interface will be new and generally unfamiliar to a user of the phone. As a result, the user of the phone 200 may desire to enter into a tutorial mode in order to determine how a known function in the user's previous interface is performed in the new user interface. In this illustration, the user wants to learn how to execute the speed dial of a stored number in the new user interface. The user knows how to perform this function in the old interface but now needs instruction for execution in the new user interface. Therefore, in this illustration, the user would enter a tutorial mode by pressing soft key "B" 204, which selects the tutorial function 205.

Figure 3:
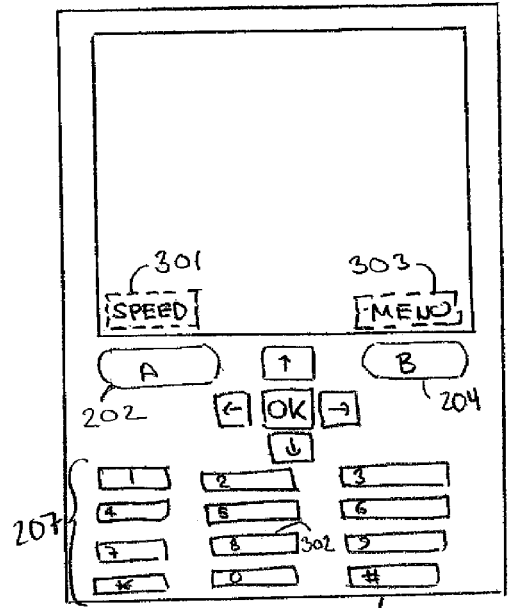
FIG. 3 comprises a schematic example of a display as configured in accordance with various embodiments of the invention.

Referring now to FIG. 3, upon selection of the tutorial mode, a partially disabled second user interface is presented to the user. The second user interface will be an interface previously known to the user and, as a result, the user will have some familiarity with the functions associated with the second user interface. Again, this second user interface is partially disabled such that the selected functions are not executed but, rather, are simply detected so that the corresponding function may be shown in the first user interface. In the second user interface shown in FIG. 3, the user interface is different from the first user interface in that the soft key "A" 202 corresponds to a "speed" function 301 and the soft key "B" 204 corresponds to a "menu" function 303. In this illustration, the user knows that to speed dial a stored number that is assigned to the "8" key, the user must select soft key "A" 202 to select the "speed" function 301 and then select the number "8" 302 from the keypad 207. Therefore, the user will perform this series of selections by pressing "A" 202 and then the "8" key 302 in the second user interface.

Figure 4:
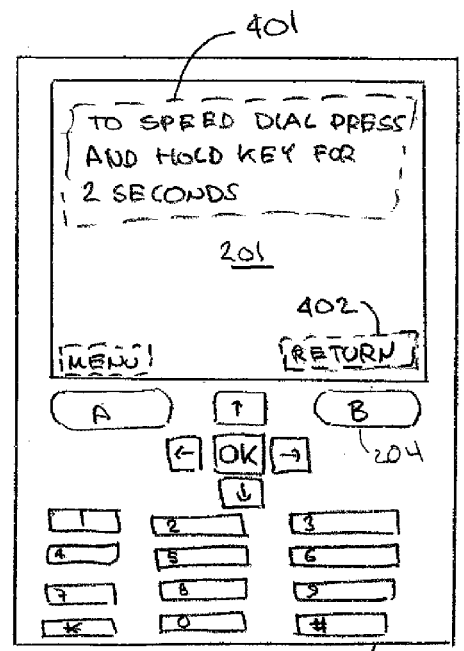
FIG. 4 comprises a schematic example of a display as configured in accordance with various embodiments of the invention.

Upon selecting the function in the second user interface, the user is then presented again with the first user interface in a tutorial mode, as shown in FIG. 4. The first user interface will now instruct the user how to perform the corresponding function in the first user interface. In this illustration, the display 201 provides a textual instruction 401 that directs the user how to speed dial in the first user interface by displaying "To speed dial press and hold key for 2 seconds." The user is also provided with an option to "return" 402 to normal operation of the first user interface by selecting soft key "B" 204 and exiting the tutorial mode.

Figure 5:
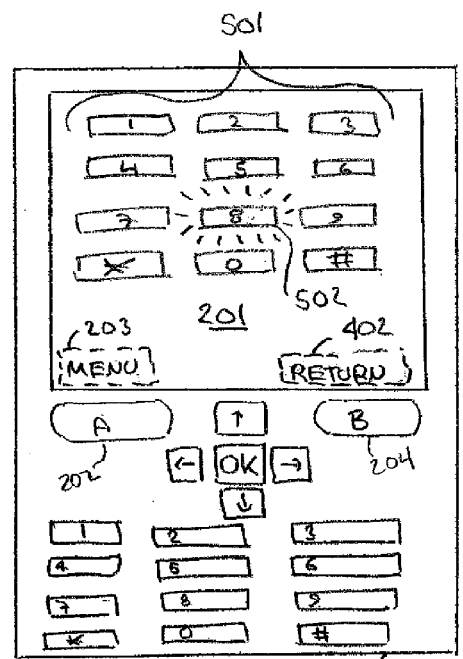
FIG. 5 comprises a schematic example of a display as configured in accordance with various embodiments of the invention.

Referring now to FIG. 5, the first user interface may further instruct the user how to speed dial by providing a graphical representation 501 of how to perform the function. In this illustration, the display 201 shows a graphical representation 501 of the numbered keypad. The graphical representation 501 may then highlight the number "8" 502 to indicate that the speed dial function is performed in the first user interface by pressing the "8" key on the keypad. The number "8" 502 may be highlighted in any of the ways mentioned above, such as, for example, animating or visually altering the number "8" 502 key as shown in the graphical representation 501 of the display. The number "8" 502 may also be highlighted by any of a variety of other options, such as by having an audible instruction to select "8." The first user interface may also provide an indication that the number "8" 502 should be held for two seconds in order to speed dial the number assigned to the "8" key. This indication may be given in any of a variety of ways, such as, for example, by an audible instruction, a textual instruction in the display, or by changing the appearance of the number "8" 502 in the display for a duration of two seconds. After the user has observed and learned the speed dial instruction, the user may then press soft key "B" 204 to select the "return" function 402 in order to exit the tutorial mode and return to normal operation of the first user interface. If desired, a function may be provided to allow the user to replay or repeat the instruction In another illustration, the user may want to learn how to enter a name entry for the phonebook of the mobile phone. Referring again to FIG. 2, the user may again enter the tutorial mode by selecting soft key "B" 204, which selects the tutorial function 205. Again, the second user interface, as shown in FIG. 3, is presented. In the familiar second interface, the user knows that to access the name entry function for the phonebook, the user must first go into the menu. Therefore, the user would press soft key "B" 204 to select the menu function 303.

Figure 6:
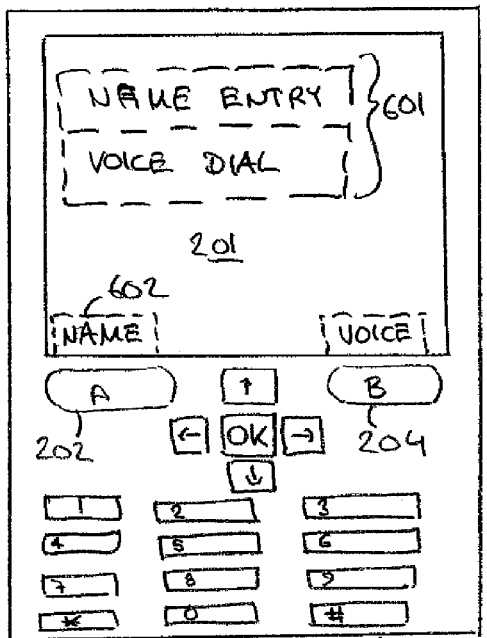
FIG. 6 comprises a schematic example of a display as configured in accordance with various embodiments of the invention.
Figure 7:
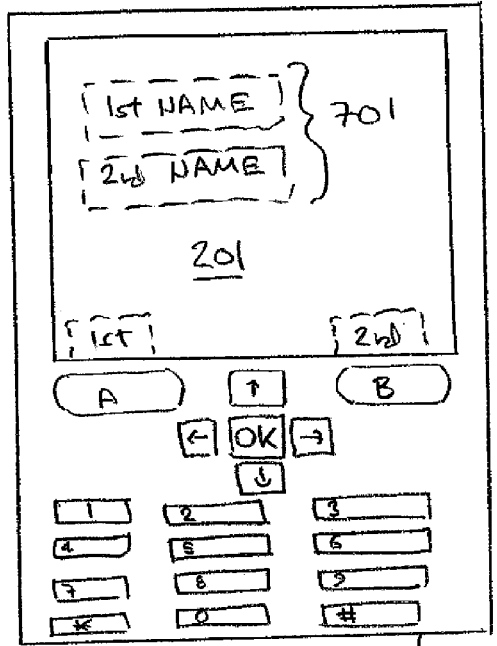
FIG. 7 comprises a schematic example of a display as configured in accordance with various embodiments of the invention.

Upon selecting the menu function 303, the display 201 shows the menu options 601 of the second user interface, as shown in FIG. 6. The menu options 601 include a "name entry" option and a "voice dial" option. The "name entry" option may be selected by pressing soft key "A" 202 to select the name function 602. At this point, the user has completed selection of the name entry function in the partially disabled second user interface. For purposes of illustration, FIG. 7 shows how a user would have proceeded to enter the name of a contact for the address book in a fully enabled second user interface. The display 201 shows options for two entry fields 701 for "first name" and "last name," with both entries being required for a valid entry.

Once the user has completed its selection of the name entry function 602 as shown in FIG. 6, an instruction for performing a substantially similar function will now be shown in the new user interface. Therefore, referring momentarily to FIG. 1, the first user interface is again presented. The tutorial mode of the first user interface will now instruct the user how to select the name entry function in the first user interface. The instruction in the first user interface will first direct the user to select the menu function 203 by pressing soft key "A" 202. Again, this instruction may be provided by any of the methods previously discussed, such as by highlighting the menu function in some manner.

Figure 8:
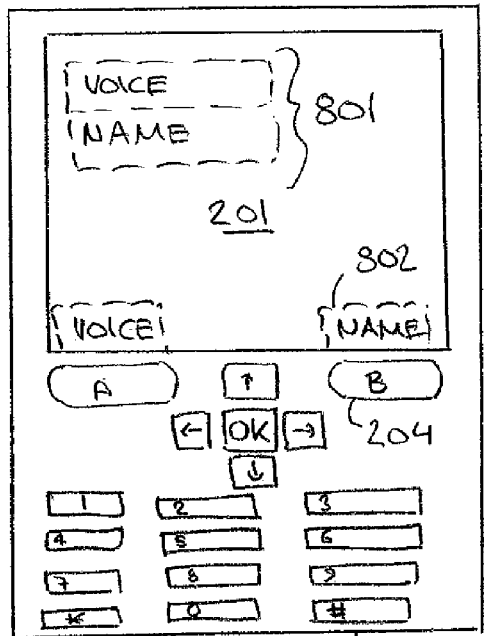
FIG. 8 comprises a schematic example of a display as configured in accordance with various embodiments of the invention.
Figure 9:
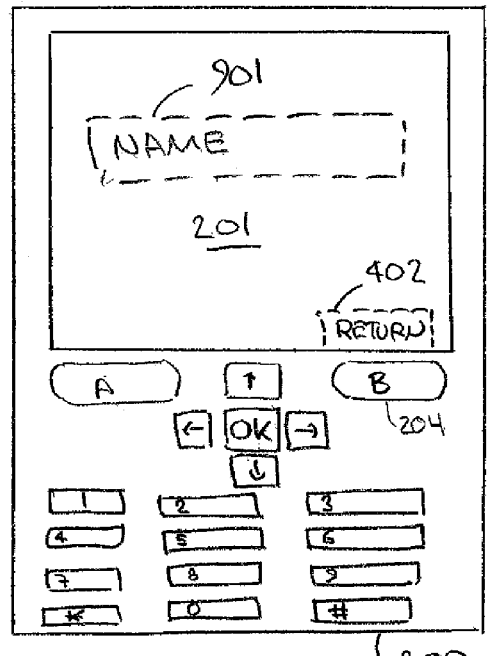
FIG. 9 comprises a schematic example of a display as configured in accordance with various embodiments of the invention.

Upon showing the instruction to select the menu function 303, the display 201 will then advance and show the menu options 801 of the first user interface, as shown in FIG. 8. The menu options 801 include a "voice" option and a "name" option. The tutorial mode will then instruct the user that the "name" option should be selected by pressing soft key "B" 204 to select the name function 802. Again, the instruction may be provided by any of the previously discussed methods. The display 201 will then advance to show the name entry screen, as shown in FIG. 9, which displays a "name" entry field 901. After the user has observed and learned the name entry instruction, the user may then press soft key "B" 204 to select the "return" function 402 in order to exit the tutorial mode and return to normal operation of the first user interface.

It should be noted that the name entry function in the first user interface comprises only one "name" entry field 901, as compared to the two entry fields 701 for "first name" and "last name" in the second user interface. Therefore, name entry in the second user interface was a two step entry process, while name entry in the first user interface is a one step process.

Figure 10:
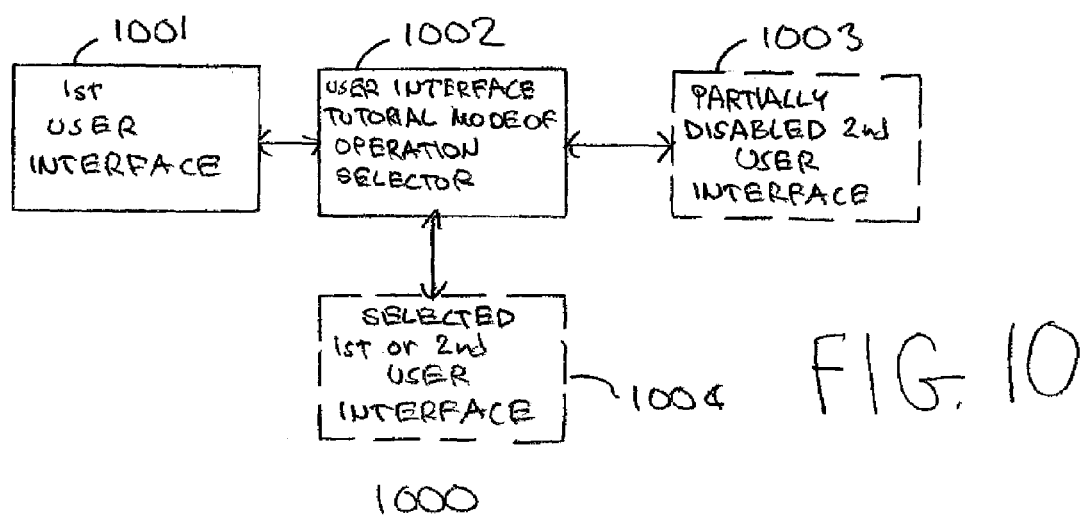
FIG. 10 comprises a flow diagram as configured in accordance with various embodiments of the invention.

Those skilled in the art will appreciate that the above-described processes are readily enabled using any of a wide variety of available and/or readily configured portable electronic devices. Referring now to FIG. 10, an illustrative approach to such a device will now be provided. FIG. 10 generally depicts pertinent portions of a portable electronic device 1000 for mapping corresponding functions in a user interface. This portable electronic device 1000 includes generally a first user interface 1001, a user interface tutorial mode of operation selector 1002, and optionally a partially disabled second user interface 1003.

The portable electronic device 1000 has a first and a second mode of operation, wherein the first mode of operation comprises an ordinary mode of operation and the second mode of operation comprises a user interface tutorial mode of operation. Examples of a portable electronic device include, but are not limited to:

- a portable wireless communication device;
- a personal digital assistant;
- a palmtop computer; and/or
- a consumer entertainment device (for example, a set-top box or a digital video recorder), to note but a few relevant examples.

The portable electronic device 1000 further comprises a first user interface 1001 comprising a plurality of user-selectable functions. Again, it is appreciated that a variety of user interfaces are known in the art and can be unique to the particular device involved. The first user interface can comprise, for example, at least one of:

- a display;
- a touch-sensitive display;
- at least one soft key;
- at least one virtual key;
- a voice recognition interface;
- a cursor movement interface;
- a handwriting recognition interface;
- an orientation-sensitive interface;
- at least one key; and/or
- a finger tracking interface.

The portable electronic device 1000 also comprises a user interface tutorial mode of operation selector 1002. Upon detecting a user selection of the tutorial mode of operation, the user interface tutorial mode of operation selector 1002 will replace the first user interface 1001 with at least a partially disabled second user interface 1003 that is different than the first user interface. Replacing the first user interface 1001 comprises completely substituting the displayed content of the first user interface with the displayed content of the second user interface 1003, such that the displayed content of the second user interface completely covers the displayed content of the first user interface. The selected second user interface 1004 will then be displayed in the portable electronic device.

The user interface tutorial mode of operation selector 1002 will then detect a user selection of at least one user-selectable function via the disabled second user interface to provide a selected user-selectable function. Upon detecting the function, the tutorial mode of operation selector 1002 will provide the user with information regarding at least one corresponding user-selectable function in the first user interface that comprises a substantially similar function as the selected user-selectable function. The portable electronic device will then display the selected first user interface 1004 to provide the information.

The information provided to the user regarding the at least one corresponding user-selectable function may comprise, at least in part, a highlighted user-selectable portion of the first user interface as corresponds to the at least one corresponding user-selectable function. The highlighted user-selectable portion of the first user interface may comprise at least one of:

an animated user-selectable portion;
an altered visual aspect of the user-selectable portion;
an altered audible aspect of the user-selectable portion;
audible context information; and/or
an animated user-selection tool.

The highlighted user-selectable portion of the first user interface that corresponds to the at least one corresponding user-selectable function may also comprise information regarding modality differences as differentiate the first user interface and the second user interface. As discussed above, the mode of execution of a particular function in each interface may be different. Therefore, the highlighted portion may contain information to provide the user with notice of the modality difference.

The teachings, as set forth, provide for a user-friendly method for mapping corresponding functions in a user interface. As a result, a user is provided with a dynamically configured, user-initiated instruction for how to operate a new user interface as compared to an old user interface. The instructions will assist the user in understanding corresponding functions between the old interface and the new interface, thereby easing the transition from one interface to the other. This mapping process is relatively intuitive and will assist the user in learning new user interface arrangements and functions.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   in a portable electronic device:
   presenting a first user interface representing a new user interface;
   detecting a selection by a user of a tutorial function via the first user interface;
   in response to detecting user selection of the tutorial function, replacing the first user interface with a at least partially disabled second user interface representing a previously used interface that is different from the first user interface;
   detecting a user selection of at least one user-selectable function via the second user interface to perform a selected task, wherein the at least one user-selectable function comprises at least one step performed by the user in order to perform the selected task in the at least partially disabled second user interface and the at least partially disabled second user interface does not execute the selected task; and
   providing the user with tutorial information regarding at least one corresponding user-selectable function in the first user interface to execute a substantially similar task to the selected task, wherein the at least one corresponding user-selectable function comprises at least one step performed by the user in order to perform the substantially similar task in the first user interface and the at least one corresponding user-selectable function in the first user interface differs from the at least one user-selectable function in the second user interface.

2. The method of claim 1 wherein the portable electronic device comprises at least one of:
   a portable wireless communication device;
   a personal digital assistant;
   a palmtop computer;
   a consumer entertainment device.

3. The method of claim 1 wherein presenting a first user interface comprises providing at least one of:
   a display;
   a touch-sensitive display;
   at least one soft key;
   at least one virtual key;
   a voice recognition interface;
   a cursor movement interface;
   a handwriting recognition interface;
   an orientation-sensitive interface;
   at least one key;
   a finger tracking interface.

4. The method of claim 1 wherein providing the user with tutorial information regarding the at least one corresponding user-selectable function in the first user interface to execute the substantially similar task comprises automatically actuating a macro to facilitate providing the user with the tutorial information.

5. The method of claim 1 wherein providing the user with tutorial information regarding the at least one corresponding user-selectable function in the first user interface to execute the substantially similar task comprises highlighting a user-selectable portion of the first user interface that corresponds to the at least one corresponding user-selectable function.

6. The method of claim 5 wherein highlighting the user selectable portion of the first user interface comprises at least one of: animating the user-selectable portion; altering a visual aspect of the user-selectable portion; altering an audible aspect of the user-selectable portion; providing audible context information; and animating a user-selection tool.

7. The method of claim 5 wherein highlighting the user-selectable portion of the first user interface comprises providing information regarding modality differences that differentiate the first user interface from the second user interface.

8. The method of claim 1 wherein replacing the first user interface with the second user interface that is different from the first user interface comprises at least one of: using a pre-provisioned version of the second user interface; using a pre-provisioned abridged version of the second user interface; and obtaining at least a portion of the second user interface from a remote source.

9. The method of claim 1 wherein providing the user with tutorial information regarding at least one corresponding user-selectable function in the first user interface to execute the substantially similar task comprises at least one of: using a correlation reference that directly correlates user-selectable functions for the first user interface with user-selectable functions for the second user interface; and using a correlation reference that indirectly correlates user-selectable functions for the first user interface with user-selectable functions for the second user interface.

10. A portable electronic device having at least a first and a second mode of operation, wherein the first mode of operation comprises an ordinary mode of operation and the second mode of operation comprises a user interface tutorial mode of operation, the portable electronic device comprising:
- a first user interface representing a new user interface and comprising a plurality of user-selectable functions;
- a user interface tutorial mode of operation selector;
- wherein the user interface tutorial mode of operation comprises, upon detecting a selection by a user of the user interface tutorial mode of operation selector:
  - replacing the first user interface with a at least partially disabled second user interface representing a previously used interface that is different from the first user interface; and
  - upon detecting a user selection of at least one user-selectable function via the second user interface perform a selected task, wherein the at least one user-selectable function comprises at least one step performed by the user in order to perform the selected task in the at least partially disabled second user interface and the at least partially disabled second user interface does not execute the selected task, providing the user with tutorial information regarding at least one corresponding user-selectable function in the first user interface to execute a substantially similar task to the selected task, wherein the at least one corresponding user-selectable function comprises at least one step performed by the user in order to perform the substantially similar task in the first user interface and the at least one corresponding user-selectable function in the first user interface differs from the at least one user-selectable function in the second interface.

11. The portable electronic device of claim 10 wherein the portable electronic device comprises at least one of:
- a portable wireless communication device;
- a personal digital assistant;
- a palmtop computer;
- a consumer entertainment device.

12. The portable electronic device of claim 10 wherein the first user interface comprises at least one of:
- a display;
- a touch-sensitive display;
- at least one soft key;
- at least one virtual key;
- a voice recognition interface;
- a cursor movement interface;
- a handwriting recognition interface;
- an orientation-sensitive interface;
- at least one key; and
- a finger tracking interface.

13. The portable electronic device of claim 10 wherein the tutorial information comprises, at least in part, a highlighted user-selectable portion of the first user interface that corresponds to the at least one user-selectable function in the second user interface.

14. The portable electronic device of claim 13 wherein the highlighted use-selectable portion of the first user interface comprises at least one of:
- an animated user-selectable portion; an altered visual aspect of the user-selectable portion; an altered audible aspect of the user-selectable portion; audible context information; and an animated user-selection tool.

15. The portable electronic device of claim 13 wherein the highlighted use-selectable portion of the first user interface comprises information regarding modality differences that differentiate the first user interface from the second user interface.

* * * * *

UNITED STATES PATENT AND TRADEMARK OFFICE
CERTIFICATE OF CORRECTION

PATENT NO. : 7,467,352 B2  Page 1 of 1
APPLICATION NO. : 11/275375
DATED : December 16, 2008
INVENTOR(S) : Theodore R. Arneson et al.

It is certified that error appears in the above-identified patent and that said Letters Patent is hereby corrected as shown below:

Title Page, Item (54), in Title, after "USER" insert -- INTERFACE --, therefor.

Title Page, Item (56), under "OTHER PUBLICATIONS", delete "prgressive" and insert -- progressive --, therefor.

IN THE SPECIFICATION

In Column 1, Line 2, after "USER" insert -- INTERFACE --.

IN THE CLAIMS

In Column 12, Line 23, in Claim 14, delete "use-selectable" and insert -- user-selectable --, therefor.

In Column 12, Line 30, in Claim 15, delete "use-selectable" and insert -- user-selectable --, therefor.

Signed and Sealed this

Fourth Day of August, 2009

JOHN DOLL
*Acting Director of the United States Patent and Trademark Office*